3,519,522
STRENGTHENING OF PHOTOSENSITIVE GLASS ARTICLES

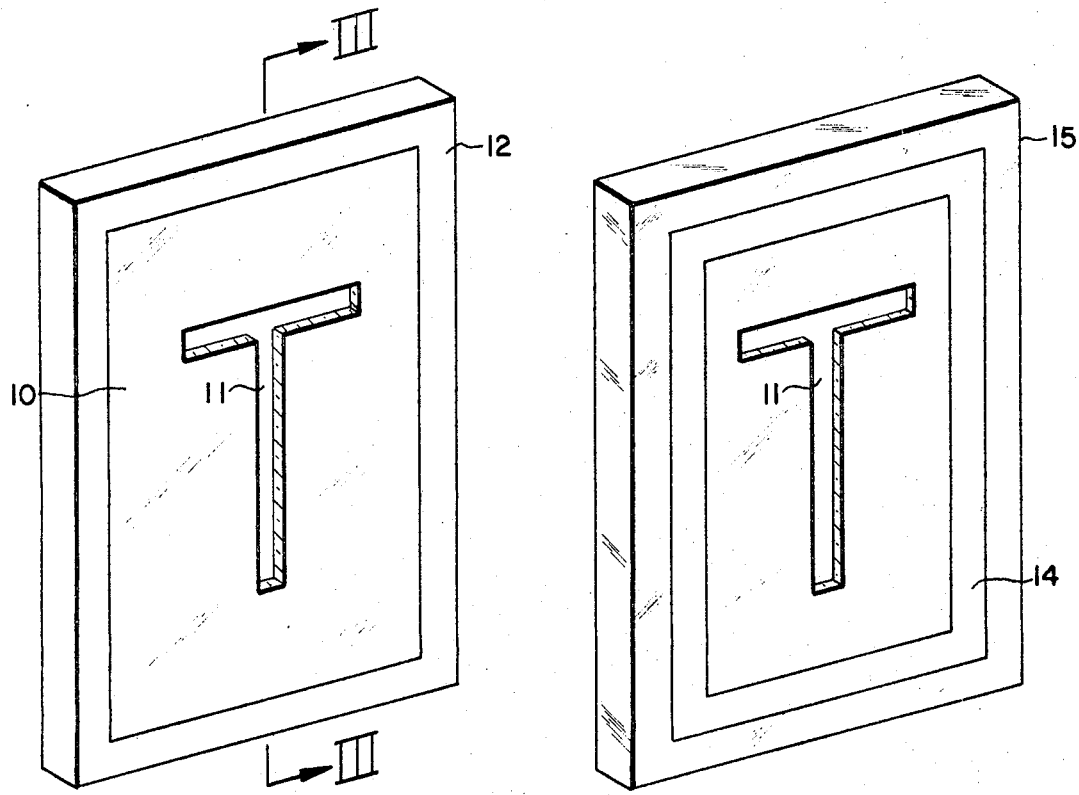
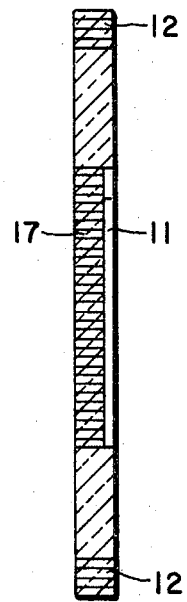
Fig. 1
Fig. 2
Fig. 3
INVENTOR.
JOSEPH FERENCE

Joseph Ference, Corning, N.Y., assignor to Corning Glass Works, Corning, N.Y., a corporation of New York
Filed Dec. 21, 1966, Ser. No. 603,592
Int. Cl. C03c *15/00*; B44f *1/06*; G03c *5/00*
U.S. Cl. 161—2                                                      5 Claims

ABSTRACT OF THE DISCLOSURE

This invention relates to the manufacture of glass articles bearing surface designs in intaglio or in relief and having an integral strengthening border portion, said articles being produced from a photosensitively opacifiable glass and said border portion being comprised of crystals developed in situ within the glass having a coefficient of thermal expansion lower than that of the glass.

---

The printing industry uses rubber mats for reproductions which do not require great accuracy and detail, such as corrugated cardboard boxes, flexible packaging labels, envelopes, and business forms. These mats are very similar to the common rubber hand stamp in that the printing or inked surface is in raised relief.

Metal masters have generally been used to make the rubber mats. The metal master is first exposed to radiation through a negative whose image is that of the desired rubber mat. The image is then developed by some suitable process and thereafter the master is selectively etched so that the exposed and developed areas are dissolved or otherwise removed leaving a depressed relief or intaglio surface design. Finally, uncured rubber is heated and pressed into the metal master such that, when removed, it demonstrates in raised relief, the form of the image or that portion dissolved out of the metal master. It has been desired to produce clearer, sharper and more well-defined images but this has not been possible using the metal master because the etching of the image is extremely difficult to control.

Differentially-soluble photosensitive glasses are well known in the art as is disclosed in Stookey U.S. 2,628,160 and 2,684,911. These glasses upon exposure to ultra-violet radiation and proper heat treatment will form crystallites in the exposed areas. Depending upon the glass composition, these crystallites can be dissolved selectively from the remaining glass. After the glass has been selectively exposed, heat treated and etched, the surface will bear a three dimensional surface design in intaglio. The exposure and etching of glass is an easily controllable process and as such results in sharp, well-defined intaglio designs. Therefore, the use of such a glass and process would be ideal for making high quality rubber printing mats.

Since glass by its very nature is more brittle than metal, it was not surprising to find that the glass plates commonly broke during handling and during the forming of the rubber mats. As a result, the glass plates had to be handled with a great deal of care and were small in size. Even with such precautions, the glass plates failed after a few uses and although they were superior in quality, they lacked the needed life for commercial usage.

The term Glass Master as used hereinafter is a trademark of Corning Glass Works which identifies glass plates bearing an intaglio design as being a product of Corning Glass Works.

Attempts to chemically strengthen the glass by ion exchange failed to provide the needed life. Furthermore, if there was any lack of parallelism in the press, the strengthening was not sufficient to prevent breakage. Hence, in order to reduce breakage while forming the rubber mat, the rubber mat had to be made thicker. Generally speaking, a thick rubber mat will not print as accurately or clearly as a thinner rubber mat; and, as a result, is less desirable than a thin rubber mat.

It is, therefore, an object of this invention to make a strong Glass Master plate which will not break readily during handling and processing.

It is a further object to find a method to make rubber printing mats without excessive breakage of the plates.

Still a further object was to make a glass plate capable of producing large thin rubber mats.

The following discussion of my invention will best be understood when considered with the following drawings:

FIG. 1 is a perspective view of a Glass Master plate having an intaglio surface design and peripheral opacified border.

FIG. 2 is a perspective view of a Glass Master plate having an intaglio surface design and an inwardly disprocessing has been reduced, larger Glass Master plates have been made, and correspondingly larger and thinner mats have been produced.

FIG. 3 is a cross sectional view taken along line III—III of FIG. 1.

In accordance with the present invention, I have discovered a method of making Glass Master plates of superior strength by encircling the intaglio design with a crystalline opacified border portion and a method of using such strengthened Glass Master plates. By utilizing the strengthened glass plate, breakage in handling and processing has been reduced, larger Glass Master plates have been made, and correspondingly larger and thinner mats have been produced.

It was found that breakage generally occurred because cracks started at edge imperfections and propagated through the glass plates and surface design. The crack propagation is retarded or arrested by placing a barrier between the crack and the surface design. The barrier is an opacified border portion.

When the surface is exposed to ultra-violet radiation to create the desired image, a border portion which encircles the image is also exposed. As disclosed by Stookey, this exposure by ultra-violet radiation creates nucleation sites, upon which crystallites (such as lithium metasilicate, lithium disilicate or barium disilicate) will grow when the glass is properly heat treated. Hence, upon heat treatment the image and the border portion will be opacified.

The border portion and the surface of the image on the opposite side from which the plate was exposed, are masked with an acid resistant material. The entire plate is then immersed in an acid bath wherein the unmasked opacified surface is selectively etched or dissolved out of the glass. The depth of etching can be controlled by the length of time the plate is in the acid bath. After etching, the opal or crystalline border portion, which extends substantially through the thickness of the plate, and a portion of the image remains undissolved. Any cracks which originate at the edge will travel toward the center of the plate but will come into contact with the opacified border portion, and under normal handling and processing, will not readily propagate through the border portion.

If the border portion is continuous and encircles the design, there is the further advantage that the border portion is in a state of compression. This state of compression is created because the coefficients of thermal expansion of the crystals developed in the opacified border is lower than that of the base glass. The great enhancement in strength which a surface compression layer imparts to glass articles is well-recognized in the art. However, the compressive stress in this crystallized border portion not only increases the overall mechanical strength of the glass plates but also acts to reduce crack formation and inhibit crack propagation. Thus, the border portion serves three functions: (1) it increases the overall mechanical strength of the article, (2) acts as a barrier to crack propagation because it is crystalline and (3) inhibits crack formation and propagation because it is in a state of compression.

FIG. 1 represents a glass plate 10 with the intaglio surface design 11 in the form of the letter T etched therein and the opacified strengthening border 12. In this figure, the border is at the outer edge of periphery of the plate but as shown in FIG. 2, the encircling border 14 can be displaced inwardly from the periphery 15 and still achieve the desired strengthening effect. FIG. 3 is a cross sectional view along line III—III showing the intaglio surface design 11 and the opacified border 12. Numeral 17 represents the opacified portion of the image which remains after etching. In the preferred embodiment, the border is the peripheral edge portion of the master.

I have also found that strength of the opacified border is not affected by the heating and cooling which the Glass Master plate experiences during the manufacture of the rubber mats.

Breakage due to handling has been substantially reduced as a result of this strengthening border and the border has aided in reducing the process breakage. Failures which have occurred during the heating and pressing operation were usually due to a lack of parallelism in the press. I have found that placing a resilient heat resistant pad of silicone rubber under the Glass Master plate substantially reduces the breakage during pressing. This pad has been able to wthstand the high processing temperatures (307° F.) and not take a permanent set, thereby being able to correct for the lack of parallelism between the plates of the press and still prevent breakage of the Glass Master plate.

My invention is further illustrated by the following examples.

EXAMPLE I

A glass plate (18" x 22" x .095") having about the following composition of 80% $SiO_2$, 1.5% $Na_2O$, 4% $K_2O$, 9% $Li_2O$, 4% $Al_2O_3$, 1% ZnO, .35% $Sb_2O_3$, .015% $CuO_2$, .12% Ag, and .001% Au, was exposed through a negative by ultra-violet radiation (2900–3300 A.) to form an image and border. The plate was first heated to 530° C. for 48 minutes and then to 628° C. for 42 minutes to develop the image and border. The border was .5" wide and .095" thick and encircled the image. The border and one surface of the image were then masked with Minnesota Mining and Manufacturing No. 470 tape. Next, the plate was immersed in a 35% by weight hydrofluoric acid bath for 28 minutes to dissolve part of the image. After etching the image was .028" deep in the plate.

The plate was then placed, with the intaglio design upward, on a Silastic #55 silicone rubber pad. A 16" x 20" x .120" sheet of uncured rubber was then placed on top of the plate. The press was then closed and the silicone rubber pad, master and rubber were subjected to a pressure of 1000#/inch² and temperature of 307° F. for 10 minutes. A cured rubber mat, about 16" x 20" was removed and had a thickness of .105" and a printing surface raised .028" above the flat rubber surface.

EXAMPLE II

A glass plate of the same composition and size as that in Example I was exposed, developed and etched in the same manner as in Example I. A sheet of uncured rubber having dimensions of about 16" x 20" x .050" was heated, pressed and cured in the same manner as in Example I. The dimensions of the cured rubber mat were about 16" x 20" x .045" with the printing surface about .028" above the flat rubber surface.

EXAMPLE III

A glass plate of the same composition and size as Example I was exposed, developed and etched in the same manner, except the opacified border was 2.0 inches wide instead of .5 inch wide. A rubber printing mat of the same dimensions was then made as in Example I.

It is readily understood that the principles of the present invention can be practiced by utilizing other opacifiable photo-sensitive glass compositions and other thermal treatments than shown in the above examples.

I claim:

1. A glass article bearing a surface design in intaglio or in relief and having an integral border portion in a state of compression, said article comprising a photosensitively opacifiable glass with an integral border portion consisting of crystals dispersed in the glass having a coefficient of thermal expansion lower than that of the glass.

2. A glass article according to claim 1 wherein said crystals consist of lithium metasilicate and/or lithium disilicate and/or barium disilicate.

3. A glass article according to claim 1 wherein said border portion is continuous and encircles the design.

4. A method for manufacturing a glass article bearing a surface design in intaglio or in relief and having an integral border portion in a state of compression which comprises:
  (a) exposing a photosensitively opacifiable glass article to ultra-violet radiations in selected areas defining the desired design and border portions;
  (b) heating said article to cause the growth of crystals within the glass in said selected areas having a coefficient of thermal expansion lower than that of the glass;
  (c) masking said border portion and one surface of said design portion with an acid resistant material; and then
  (d) contacting said article with an acid which will dissolve the crystallized glass while leaving the other portion of the article essentially unchanged.

5. A glass article according to claim 4 wherein said crystals consist of lithium metasilicate and/or lithium disilicate and/or barium disilicate.

References Cited

UNITED STATES PATENTS

| | | | |
|---|---|---|---|
| 2,515,937 | 7/1950 | Stookey | 96—34 |
| 2,910,807 | 11/1959 | Chan et al. | 65—115 |
| 3,370,948 | 2/1968 | Rosenbauer | 96—36.2 |

JACOB H. STEINBERG, Primary Examiner

U.S. Cl. X.R.

65—31; 96—34, 36; 156—14, 15, 24

UNITED STATES PATENT OFFICE
CERTIFICATE OF CORRECTION

Patent No. 3,519,522                          July 7, 1970

Joseph Ference

It is certified that error appears in the above identified patent and that said Letters Patent are hereby corrected as shown below:

Column 2, cancel lines 20, 21 and 22, and insert -- placed opacified border; and --. Column 3, line 34, "wtihstand" should read -- withstand --.

Signed and sealed this 23rd day of February 1971.

(SEAL)
Attest:

Edward M. Fletcher, Jr.                     WILLIAM E. SCHUYLER, JR.
Attesting Officer                              Commissioner of Patents